Dec. 7, 1937.　　M. H. GRAHAM　　2,101,062
AUTOMATIC TOASTER
Filed March 10, 1933　　3 Sheets-Sheet 1
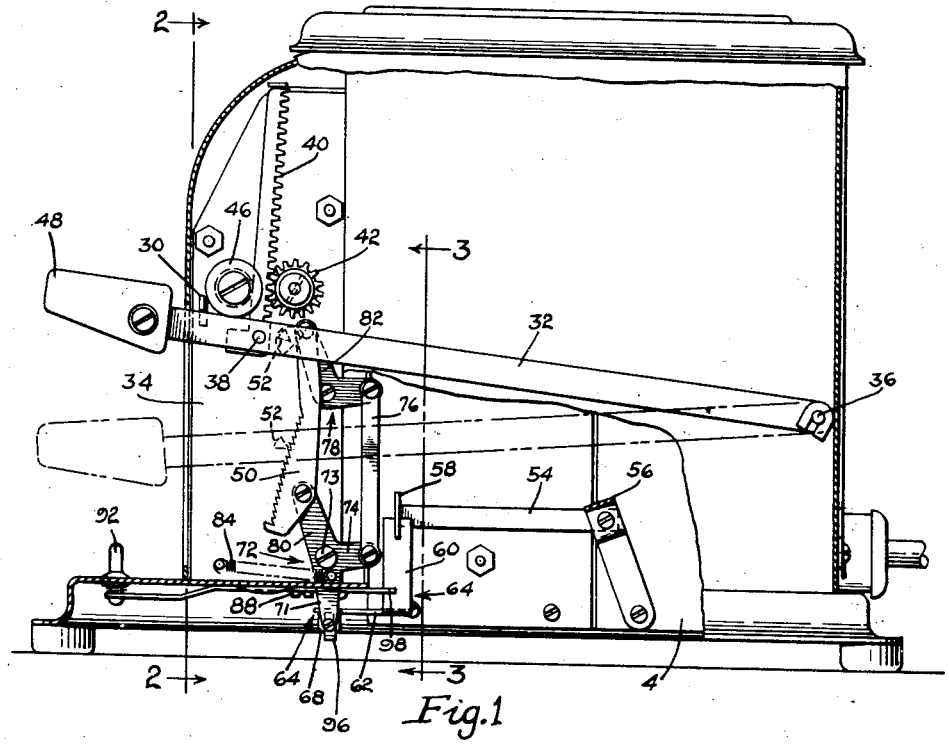
Fig. 1
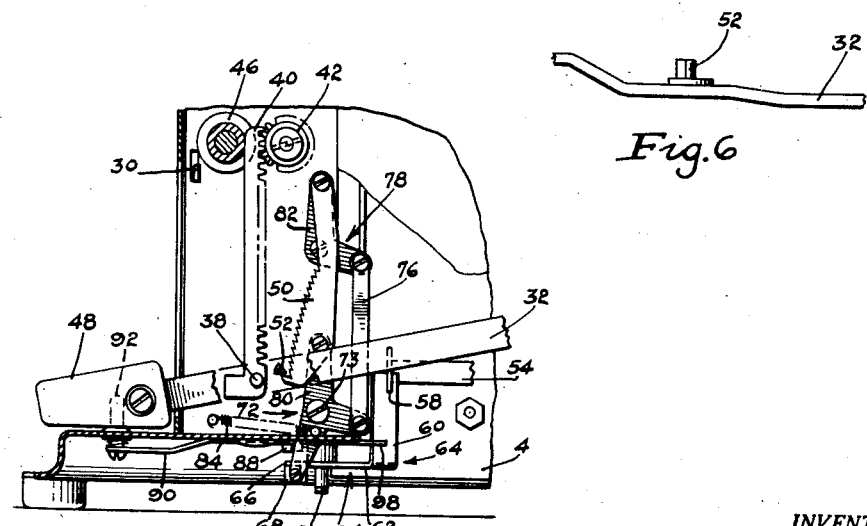
Fig. 5
Fig. 6
INVENTOR.
MAURICE H. GRAHAM
BY Paul, Paul & Moore
ATTORNEYS.

Dec. 7, 1937. M. H. GRAHAM 2,101,062
AUTOMATIC TOASTER
Filed March 10, 1933 3 Sheets-Sheet 2

INVENTOR.
MAURICE H. GRAHAM
BY Paul, Paul & Moore
ATTORNEYS.

Dec. 7, 1937.    M. H. GRAHAM    2,101,062
AUTOMATIC TOASTER
Filed March 10, 1933    3 Sheets-Sheet 3

INVENTOR.
MAURICE H. GRAHAM
BY Paul, Paul & Moore,
ATTORNEYS.

Patented Dec. 7, 1937

2,101,062

UNITED STATES PATENT OFFICE 2,101,062

AUTOMATIC TOASTER

Maurice H. Graham, Minneapolis, Minn.

Application March 10, 1933, Serial No. 660,271

13 Claims. (Cl. 219—19)

This invention relates to automatic toasters and has for a general object the provision of an improved type of toaster which is operative to toast each bread slice inserted to a predetermined degree, irrespective of temperature conditions prevailing within the toaster at the beginning of each toasting operation.

Various types of toasters have heretofore been proposed but the particular type with which this invention concerns itself is that type wherein the toasting interval is determined by a timing mechanism under the control of a thermostatic device responsive to temperature conditions within the toaster. In one such type of previously proposed toasters the arrangement of the timing mechanism and thermally responsive device in the toaster is such that the duration of the toasting interval, i. e., the interval during which time the bread slice is subjected to the heat from the heating means, is determined from the temperature of the toaster at the instant of the end of the interval. In my previously filed application, Serial Number 633,765, for Automatic toaster, filed September 19, 1932, Patent Number 2,039,956, there is described a toaster wherein the toasting interval is determined by a variable speed clock under the control of a thermally responsive device subject to toaster conditions and in which toaster the temperature conditions prevailing within the toasting space at all periods throughout the toasting interval determine its length. In contradistinction to the above types of toasters, the present invention relates to a toaster wherein the duration of the toasting period is determined and fixed at the instant the toasting period is initiated. By initiation of the toasting period is meant the beginning of the interval during which the bread slice to be toasted is subjected to the heat of the heating means and it will be apparent that the toasting interval may be initiated in any desired manner, as for example by placing the heater in operation, or by moving the bread slice within range of a heater already in operation, or by both placing the heater in operation and moving a bread slice in proximity thereto. The toasting interval is of course the period of time elapsing between the initiation of the interval and the termination thereof in any desired manner, as for instance by performing the reverse of any of the operations previously mentioned.

The toaster of the present invention, wherein the duration of the toasting interval is fixed at the initiation thereof in accordance with temperature conditions then prevailing in the toaster space, can be of simple construction and lends itself readily to the use of a constant speed rather than a variable speed timing mechanism.

The various features and objects of the invention will become more readily apparent upon a detailed review of the accompanying drawings and specification together with the appended claims.

In the drawings, which show an automatic toaster illustrating one embodiment of the invention, Figure 1 is a side view of the toaster with the outside casing removed and along lines 1—1 of Figure 2;

Figure 5 is a fragmentary enlargement showing the toaster manually adjusted to produce dark toast and the timing mechanism wound; and, Figure 6 is a fragmentary view of the winding lever.

Figure 2:
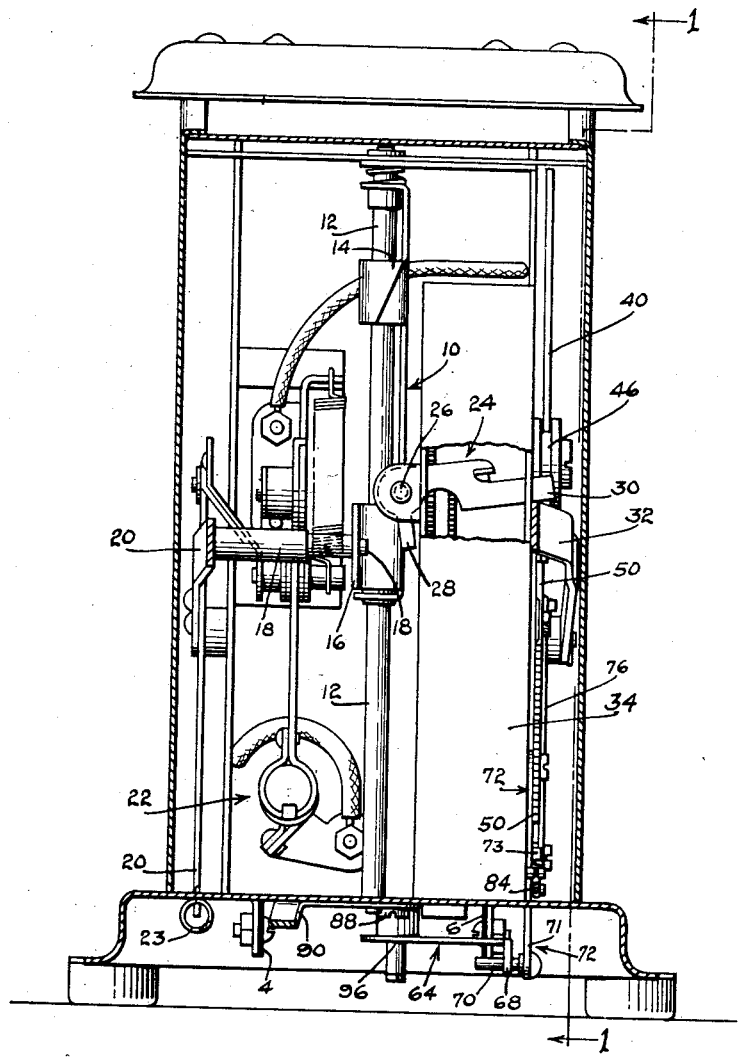
Figure 2 is a view along lines 2—2 of Figure 1.
Figure 3:
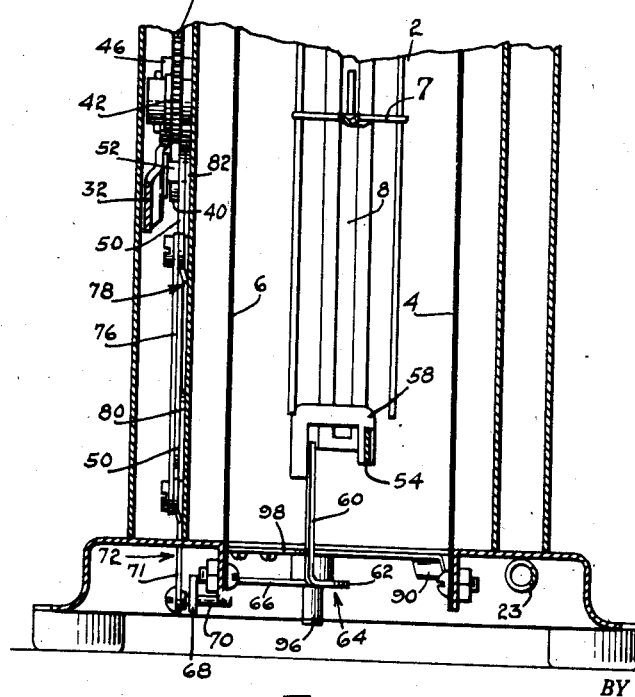
Figure 3 is a cross-section along the lines 3—3 of Figure 1.

The toaster is of the so-called "two lever" type. As here shown it is only adapted to receive a single slice of bread at a time but it is evident that it may be enlarged to produce two or more slices if desired. The toaster is of the vertical type and contains a toasting space 2 which is defined by spaced parallel electrical resistance heating elements 4 and 6. The usual vertically reciprocating bread carrier 7, shown in Fig. 3, is adapted to move up and down in this toasting space to admit bread thereto and eject it therefrom upon completion of the toasting operation, the bread carrier sliding in guides 8 arranged at the front and rear walls of the toasting space. One end of the bread carrier has rigidly secured thereto a slide member generally designated at 10 which slides upon the vertical post 12 that is secured to the toaster casing. The bread carrier of course moves to admit and eject bread from the toasting space with movements of the slide 10 which has integrally formed therewith a stop 14 and a lug 16 provided with an opening receiving a stud 18 secured to a switch and bread carrier actuating lever 20 that is pivotally connected to the toaster casing. The lever 20 is connected to a snap switch mechanism generally designated at 22 which constitutes a main switch controlling the supply of electrical current to the heating elements 4 and 6. The arrangement is such that switch 22 is open when lever 20 is in raised position as shown in Figure 2 but will be closed upon downward movement of lever 20. Thus when lever 20 is in raised position as shown in Figure 2, the bread carrier is in raised position and the switch 22 is open so that no current is supplied to the heating elements but upon depressions of lever 20 the bread carrier will be lowered into the oven and the switch 22 will be closed as aforementioned whereby a slice of bread on the carrier will be admitted to the toasting space and the heating elements will be simultaneously energized. A spring 23 is connected to the lever 20 to normally hold it and its associated parts in the positions shown in Figure 2 and depression of lever 20 takes place against the tension of this spring.

A latch member generally designated at 24 is pivoted at 26 and is in the form of a bell crank lever having an arm 28 adjacent the slide 10 and an arm 30 which cooperates with the winding lever 32 of the constant speed timing mechanism designated at 34. The latch member 24 tends to fall by gravity into a position wherein a projection formed on the arm 28 will be in the path of the stop 14 of the slide 10 and act to hold the slide in depressed position after the lever 20 has been moved downwardly. However, the winding lever 32 is adapted to engage the arm 30 to rotate latch 24 into the position shown in Figure 2 wherein the arm 28 is free of the stop 14 thereby releasing the slide and bread carrier.

The winding arm 32 is pivoted to the toaster casing as indicated at 36 and is pivotally connected as at 38 to the lower end of a rack member 40 that is held against a gear 42 secured to the winding shaft of the constant speed clock mechanism 34 by a grooved idler 46. As will be apparent from Figure 1, a depression of the lever 32 by pressure upon handle 48 will result in a lowering of the rack 40 and a consequent winding and energizing of the clock mechanism. Upon being energized, the clock mechanism operates to rotate gear wheel 42 in clockwise direction and returns lever 32 to the position shown in Figure 1, whereupon the arm 30 of the latch 24 is raised and the arm 28 is moved clear of the path of the stop 14 thereby allowing slide 10 to rise under the influence of spring 12 with the result that the switch 22 is raised and the bread carrier within the toasting space is also raised. The amount which winding lever 32 is depressed of course determines the degree of winding of the timing mechanism 34 and thus determines the time interval required to return the same into the position shown in full lines in Figure 1 wherein the latch member 24 is actuated to release the slide 10.

In the operation of the toaster, levers 20 and 32 both normally occupy the raised positions shown in Figure 2. A slice of bread is placed upon the bread carrier and the operator then simultaneously depresses levers 20 and 32 with the result that he automatically winds the clock mechanism, lowers the bread slice into the toasting space, energizes the heating elements, and releases the catch member 24 so that it will be operative to hold the bread carrier in lowermost position. The return of the lever 32 to the position shown in Figure 1 by the clock mechanism, and consequent actuation of the arm 30 of latch member 24, results in the release of the bread carrier and the opening of the switch 22. The period required for the movement of the lever from depressed position to its uppermost position is therefore the interval during which the bread is toated.

If the toasting space is already warm or hot when the bread slice to be toasted is initially admitted thereto it is necessary that the toasting interval be of a shorter duration than it would be if the toasting space were cold, provided uniform toast is to be obtained. Means for fixing the toasting interval in accordance with the temperature conditions prevailing within the toasting space are therefore provided. These means as here shown consist of a dog 50 provided with a series of stopped surfaces cooperating with a stop 52 secured to one side of the winding lever 32, and a thermostat constituting a strip of bi-metal 54 which is subject to the temperature conditions within the toasting space and is arranged to position the dog 50. The thermostat 54 is secured to a support 56 and is located between the heating elements 4 and 6 near the bottom of the toasting space and between the heating elements in such position that it is subject to the radiant heat of the heating elements and located in the draft which is naturally set up through the bottom of the toasting space and passing out of the open top thereof. The thermostat carries a fork 58 which engages the vertical portion 60 of the arm 62 of a bell crank lever generally designated at 64 and provided with another arm 66. Arm 66 carries a fork 68 between whose prongs there extends the stud 70 that is secured to one arm of the lever generally designated at 72 and which is pivoted to the casing at 73. The arm 74 of the lever 72 has pivoted thereto a link 76 which is pivoted at its other end to a bell crank lever 78. The dog 50 is pivotally connected to the arm 80 of the lever 72 and the arm 82 of the bell crank lever 78.

Figure 4:
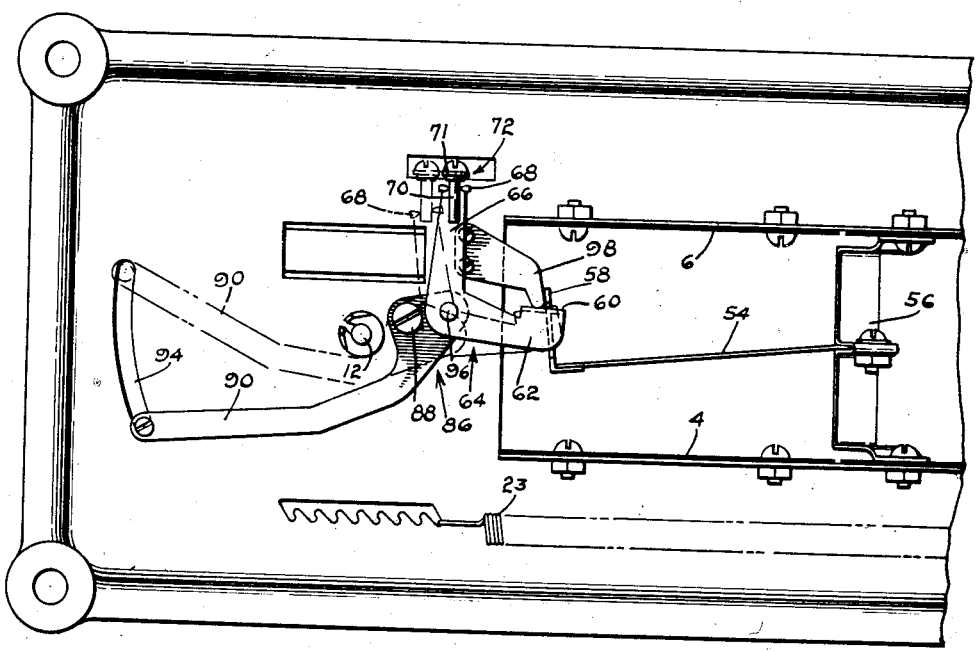
Figure 4 is a partial bottom plan view of the toaster.

When the thermostatic member is cold the dog 50 assumes the position shown in Figure 5, provided the manual adjustment is set for dark toast, but upon being heated the thermostatic member 54 deflects counterclockwise from its position shown in Figure 4 and the engagement of its fork 58 with the bell crank lever 62 causes that lever to rotate in clockwise direction with the result that levers 72 and 78 are rotated in counterclockwise direction and the dog 50 is moved to the left of the position shown in Figure 5. The amount to which dog 50 will be displaced will of course be proportional to the temperature of the bi-metallic element 54.

When the thermostat is cold the teeth on the dog 50 will be out of the path of the winding lever 32 and it is possible to completely depress lever 32, as will be evident from Figure 5. Upon being displaced to the left, however, the teeth of the dog will be projected into the path of the stop 52 and will limit the downward movement of winding lever 32 to an amount proportional of the temperature of thermostat 54. Thus if the thermostat is relatively hot, the dog will be displaced a relatively great amount to the left and it will only be possible to depress winding lever 32 a short distance but if the thermostat is relatively cool the position of the dog 50 will be further to the right and the operator will automatically depress the lever 32 a greater distance. Figure 1 illustrates in dotted lines the operation of the dog when partially moved to the left to obstruct complete depression of the lever 32. A spring 84 which is connected at one end to a stud secured to the casing and at its other end to arm 71 of the lever 72 normally urges the parts into the position shown in Figure 5 and the thermal member 54 moves the parts against the action of this spring.

Manual means for adjusting the position of the dog 50 thereby to control the desired degree of lightness or darkness of the toast are further provided. These means constitute a lever 86 which is pivoted to the toaster casing at 88 and is provided with an elongated arm portion 90 to which is attached a stud 92 extending through a slot 94 in the casing. The previously described bell crank lever 64 is pivotally mounted upon the lever 86 at 96 and upon manual manipulation of the stud 92 the position of bell crank lever 62 will be changed with the result that the lever 72 will be rotated. In this movement of the parts, the projection 60 of arm 62 of bell crank lever 64 is retained in engagement against the fixed stop 98 secured to the toaster casing and the parts are moved between the full line and dotted line positions shown in Figure 4. In the full line positions there shown the manual adjustment is set to produce light toast and the dog and its associated mechanism assumes the position shown in Figure 1 provided of course that the thermostatic member 54 has not been heated. Movement of the stud 92 and lever 90 towards dotted line position results in clockwise rotation of levers 72 and 78 so that the teeth of the dog 50 will be moved into the path of the stop on winding lever 32.

Having described the various parts of the toaster, their operation will now be set forth. Assuming that medium toast is desired, the stud 92 will be manually set at some point intermediate of the ends of slot 94 and the dog will occupy the position shown in Figure 1 of the drawings. The operator places a bread slice to be toasted upon the bread carrier and then simultaneously depresses the levers 20 and 32 with the result that the bread slice is admitted to the toasting space, the heating elements are energized, the clock mechanism is wound, and the slide 10 is latched in lowermost position. Due to the position of the dog 50 it will only be possible for the operator to depress lever 48 to the dotted line position shown in Figure 1. After the levers are depressed the clock mechanism will immediately operate to raise the winding lever 32 into the full line position shown in Figure 1 whereupon it will release the latch 24 and allow the bread carrier to rise and eject the toast, and the switch for energizing the heating elements to open, under the influence of spring 23. The toasting of this slice will raise the temperature of thermal element 54 with the result that it will move in a direction to position the dog 50 somewhat left of the position shown in Figure 1. When the operator then places his second slice upon the carrier and depresses the handle of the winding lever 32 it will not go down quite as far as it did at the time the handles were depressed for the original slice so that the toasting interval for the second slice will be correspondingly shortened. So also upon a toasting of the third slice the thermal element 54 will be even hotter and the dog 50 will operate to further reduce the downward travel of lever 32 and consequently further reduce the toasting interval. Consequently it will be seen that for any given setting of the manually operable member 92 the toasting interval for any given bread slice will be proportioned in accordance with the temperature conditions prevailing within the toasting space at its instant of initiation. As a result uniform toast will be obtained irrespective of toasting space temperature conditions at the initiation of the toasting of any given bread slice. If the operator at any time wishes the toaster to produce darker toast, it is only necessary for him to move the lever 90 in the direction of the dotted line position shown in Figure 4 and this will increase the toasting interval for each slice although the proportionality of the various intervals to the temperatures prevailing in the toaster at their initiation will be maintained.

It will be understood that the foregoing example is merely illustrative of one embodiment of the invention and that further modifications may be made as desired and as will be readily apparent to those skilled in the art.

I claim as my invention:

1. In a bread toaster having a toasting space for bread slices, means for initiating the toasting of a bread slice, a timing mechanism, means under the control of the timing mechanism for terminating the toasting of the bread slice, and thermostatic means responsive to toasting space conditions for setting the timing mechanism upon initiation of the toasting interval to fix the duration thereof in accordance with initial toasting space temperatures.

2. In a bread toaster having a toasting space for bread slices, manually operable means for initiating the toasting of a bread slice, a timing mechanism, means under the control of the timing mechanism for terminating the toasting of the bread slice, and thermostatic means responsive to toaster space conditions for controlling the timing mechanism upon initiation of the toasting interval thereby to fix the same at the initiation thereof independently of intermediate and final toasting space temperatures.

3. In a bread toaster having heating means and a toasting space for bread slices being toasted by said heating means, means for initiating operation of the heating means, a timing mechanism, means under the control of the timing mechanism for terminating operation of the heating means, and thermostatic means responsive to toaster space conditions for fixing the duration of operation of the timing mechanism at the initiation of said heating means operation, thereby to fix the duration of operation of the heating means at the initiation thereof in accordance with toaster space temperatures then obtaining.

4. In a bread toaster having heating means and a toasting space for bread slices to be toasted thereby, means for initiating the toasting of a bread slice by said heating means, a timing mechanism, means under the control of the timing mechanism for terminating the toasting of the bread slice, a thermostatic device exposed to the radiant heat of said heating means, and means associated with said thermostatic device and timing mechanism for setting the latter upon initiation of the toasting interval thereby to fix the duration thereof in accordance with initial toasting space temperatures.

5. In a bread toaster having heating means and a toasting space for bread slices to be toasted thereby, means for moving a bread slice to be toasted into said toasting space, a timing mechanism, means under the control of the timing mechanism for moving the bread slice away from said heating means upon completion of the toasting interval, a thermostatic device exposed to the radiant heat from said heating means, and means associated with said thermostatic device and timing mechanism for setting the latter upon initiation of the toasting interval thereby to fix the duration thereof in accordance with initial toasting space temperatures.

6. In a bread toaster having heating means and a toasting space for bread slices to be toasted thereby, means for moving a bread slice into said toasting space and simultaneously initiating operation of said heating means, a timing mechanism, means under the control of the timing mechanism for stopping the operating of the heating means and removing the bread slice from said toasting space thereby to terminate the toasting thereof, a thermostatic device responsive to toaster space conditions, and means associated with said device and timing mechanism for setting the latter upon initiation of the toasting interval, thereby to fix the duration thereof in accordance with initial toasting space temperatures.

7. In a bread toaster having heating means and a toasting space for bread slices to be toasted thereby, means for initiating the toasting of a bread slice to be toasted by moving the same into said toasting space and simultaneously starting operation of the heating means, a timing mechanism, means under the control of the timing mechanism for terminating the toasting of the bread slice by removing the same from said toasting space and stopping the operation of the heating means, a thermostatic device exposed to the radiant heat of said heating means and located in an air draft created thereby, and means associated with said thermostatic device and timing mechanism for setting the latter upon initiation of the toasting interval thereby to fix the duration thereof in accordance with initial toasting space temperatures.

8. In a toaster having a heating space for bread slices to be toasted, means for initiating the toasting interval, a constant speed timing mechanism, means under the control of said timing mechanism for terminating the toasting of the bread slice, and thermostatic means responsive to toaster space conditions for controlling the setting of the timing mechanism upon initiation of the toasting interval thereby to fix the same, at the initiation thereof.

9. In a bread toaster having a toasting space for bread slices, means for initiating the toasting of a bread slice, a constant speed timing mechanism, means under the control of the timing mechanism for terminating the toasting of the bread slice, and thermostatic means responsive to toaster space conditions and limiting the winding of the constant speed timing mechanism thereby to fix the toasting interval at the initiation thereof.

10. In a bread toaster having a toasting space for bread slices, means for initiating the toasting of a bread slice, a constant speed timing mechanism adapted to be wound upon initiation of the toasting of a bread slice, means associated with the timing mechanism for terminating the toasting of the bread slice, manually operable means for winding said timing mechanism, and thermastatic means responsive to toaster space conditions for limiting the operation of the said winding means thereby to limit the amount of winding of the timing mechanism and fix the toasting interval at the initiation thereof.

11. In combination with a device of the character described, a timing device comprising a clock mechanism, a member for winding said mechanism to start the operation thereof, and a thermally responsive member to vary the winding of said timing mechanism with relation to the temperature affecting said thermally responsive member.

12. In a bread toaster having a toasting space for bread slices, means for initiating the toasting of a bread slice, a timing mechanism, means under the control of the timing mechanism for terminating the toasting of the bread slice, and thermally responsive means for determining the setting of the timing mechanism upon the initiation of the toasting interval to fix the duration thereof in accordance with the temperature affecting said thermally responsive means.

13. A cooking device comprising a cooking chamber, a timing means comprising a constant speed clock mechanism for timing the operation of said device, and a thermally responsive member for varying the time period provided by said timing means in accordance with the temperature affecting said member, said member being located in a position where it will be affected by the heat within the cooking chamber to substantially the same degree or manner as the material being cooked therein.

MAURICE H. GRAHAM.